United States Patent
Hendrickson

(10) Patent No.: US 11,321,157 B2
(45) Date of Patent: May 3, 2022

(54) METHOD OF OPERATING A DIGITAL SYSTEM OPERABLE IN MULTIPLE OPERATIONAL STATES AND DIGITAL SYSTEM IMPLEMENTING SUCH METHOD

(71) Applicant: Northrop Grumman Systems Corporation, Falls Church, VA (US)

(72) Inventor: Eric L. Hendrickson, Downey, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 17/008,177

(22) Filed: Aug. 31, 2020

(65) Prior Publication Data
US 2022/0066857 A1 Mar. 3, 2022

(51) Int. Cl.
*G06F 11/07* (2006.01)
*G06F 9/4401* (2018.01)
*G06F 9/54* (2006.01)

(52) U.S. Cl.
CPC ........ *G06F 11/0772* (2013.01); *G06F 9/4406* (2013.01); *G06F 9/542* (2013.01); *G06F 11/076* (2013.01); *G06F 11/0757* (2013.01); *G06F 11/0793* (2013.01)

(58) Field of Classification Search
CPC .. G06F 11/076; G06F 11/079; G06F 11/0793; G06F 11/0772; G06F 21/554
See application file for complete search history.

(56) References Cited

U.S. PATENT DOCUMENTS

| | | | | |
|---|---|---|---|---|
| 4,589,081 A | * | 5/1986 | Massa | G08B 23/00 340/501 |
| 8,572,427 B1 | * | 10/2013 | Stancu-mara | H04L 41/0686 714/4.1 |
| 8,990,639 B1 | * | 3/2015 | Marr | G06F 11/24 714/47.3 |
| 2002/0184568 A1 | * | 12/2002 | Kurrasch | H04L 41/0681 714/39 |
| 2006/0195728 A1 | * | 8/2006 | Lin | G06F 11/0751 714/42 |

(Continued)

FOREIGN PATENT DOCUMENTS

WO  WO 2018/004810  1/2018

OTHER PUBLICATIONS

Notification of Transmittal of the International Search Report and the Written Opinion of the International Searching Authority, or the Declaration issued in related PCT Application No. PCT/US2021/039753, dated Sep. 21, 2021, 13 pages.

*Primary Examiner* — Matthew M Kim
*Assistant Examiner* — Kurosu Risa Altaf
(74) *Attorney, Agent, or Firm* — McCracken & Gillen LLC

(57) ABSTRACT

A digital system and a method of operating a digital system wherein the digital system has a digital resource and an event detector detect events of the digital resource. An operational mode of at least one of the system and the digital resource in effect during an interval is determined and a number of events that occur during the interval is accumulated. The accumulated events are compared against at least one threshold associated with the operational mode and action is taken if the comparison indicates an out-of-nominal operation of the digital resource.

14 Claims, 6 Drawing Sheets

(56) References Cited

U.S. PATENT DOCUMENTS

| | | | |
|---|---|---|---|
| 2011/0055852 A1* | 3/2011 | Smith | G06Q 40/08 |
| | | | 719/318 |
| 2011/0291746 A1* | 12/2011 | Ibrahim | G06F 1/3206 |
| | | | 327/538 |
| 2015/0180894 A1* | 6/2015 | Sadovsky | H04L 67/22 |
| | | | 726/22 |
| 2015/0199629 A1* | 7/2015 | Faile, Jr. | G06Q 10/0639 |
| | | | 705/7.28 |
| 2015/0339673 A1 | 11/2015 | Adjaoute | |
| 2016/0328561 A1 | 11/2016 | Tamir et al. | |
| 2020/0220885 A1* | 7/2020 | Will | G06F 21/554 |
| 2021/0026786 A1* | 1/2021 | Meier | G11C 16/22 |

\* cited by examiner

METHOD OF OPERATING A DIGITAL SYSTEM OPERABLE IN MULTIPLE OPERATIONAL STATES AND DIGITAL SYSTEM IMPLEMENTING SUCH METHOD

FIELD OF DISCLOSURE

The present subject matter relates generally to digital systems, and more particularly to a method of operating a digital system and a digital system incorporating such method.

BACKGROUND

A digital system or subsystem, such as a System on a Chip (SoC), one or more Application Specific Integrated Circuits (ASIC's), or one or more Field Programmable Gate Arrays (FPGA's), and combinations thereof, typically comprise many different digital resources or components (such as hardware resources) that implement functionality, such as, processors, memories, controllers, interconnects, input/output (I/O) devices, etc. Such digital resources or components may be compromised by hackers having unauthorized access to the digital system. Alternatively, one or more of the digital resources or components may malfunction, potentially resulting in improper operation of the digital system. In either case, it is important to know whether such a circumstance has arisen. Specifically, the NIST (National Institute of Standards and Technology), NIAP (National Information Assurance Partnership), and CMMC (the Cybersecurity Maturity Model Certification) standards have specified or will soon specify that digital subsystems must be actively monitored for dynamic threats that emerge. These requirements are mostly being applied to ground-based networks at present, but will also apply to avionics and payload systems in the near future.

Each of these resources or components has a certain pattern of behavior that is specific to it, and specific to the system operational context. For example, if a subsystem in a spacecraft is only communicating with a ground station, then the controller operating in accordance with the MIL-STD-1553 LAN standard and some minimal processing logic might be active. Further, there would be no expectation that some other system might be active, such as a high speed PCIe or SRIO link.

Each resource or component usually is embedded with event counters each of which counts the number of times a specific event occurs specific to that device. For example, a processor may have an event counter that counts how many times the processor needs to fetch data from main memory. Alternatively, a memory controller may have an event counter that counts how many reads have occurred since reset. In either event, such counters are often used and monitored to gauge performance and/or for debugging. Some are added by the system integrator specifically to monitor operation at the subsystem or SoC level, for example.

Past approaches to monitoring for cyberspace threats include systems that operate quickly but involve high resource costs or designs that minimize resource usage but are very slow. An alternative approach would be to operate completely in a closed system to ensure no bad agents are allowed into the system. This approach, however, undesirably limits the possible complexity of the overall system, leading to a limit on mission capabilities. The designer(s) must also review every line of code and hardware that goes into the system, and ensure the entire supply chain contains no aberrant code.

None of the foregoing alternatives is optimal for most applications.

SUMMARY

According to an aspect, a method of operating a digital system operable in multiple operational states having a digital resource and an event detector that detects events of the digital resource comprises the steps of (a.) determining an operational mode of at least one of the system and the digital resource in effect during an interval, (b.) accumulating a number of events that occur during the interval, (c.) comparing accumulated events against at least one threshold associated with the operational mode, and (d.) implementing at least one of isolationist, limiting, and corrective action if the comparison indicates an out-of-nominal operation of the digital resource. The digital system has a plurality of further event detectors that detect a plurality of further events, and the method includes the further steps of (e.) accumulating further events, (f.) weighting accumulated events, (g.) summing accumulated and weighted events to obtain an event sum, (h.) comparing the event sum to at least one threshold, and (i.) incrementing the event sum if the event sum varies from at least one threshold.

According to a further aspect, a digital system operable in multiple operational states comprises a digital resource, an event detector that detects events of the digital resource, and a security matrix having at least one event counter that accumulates a number of events of the digital resource that occur as the digital system is operating in a particular operational state during a time interval. The security matrix compares accumulated events against at least one threshold associated with the particular operational state to obtain a risk score value. A threat evaluation module implements at least one of isolationist, limiting, and corrective action if the risk score value indicates an out-of-nominal operation of the digital resource. Also, the digital system has a plurality of further event detectors that detect a plurality of further hardware events, and the security matrix is further operable to accumulate further hardware events, weighting accumulated hardware events, and summing accumulated and weighted hardware events to obtain an event sum. The security matrix is further operable to compare the event sum to at least one threshold and incrementing the event sum if the event sum varies from at least one threshold.

According to yet another aspect, a digital system operable in multiple operational states, comprises a digital resource, means for detecting events of the digital resource, and means having at least one event counter for accumulating a number of events of the digital resource that occur as the digital system is operating in a particular operational state during a time interval. The accumulating means includes means for comparing accumulated events against at least one threshold associated with the particular operational state to obtain a risk score value. The digital system further comprises means for implementing at least one of isolationist, limiting, and corrective action if the risk score value indicates an out-of-nominal operation of the digital resource. In addition, the detecting means detect a plurality of further hardware events, and the accumulating means accumulates further hardware events and includes means for weighting accumulated hardware events and means for summing accumulated and weighted hardware events to obtain an event sum. Also, the accumulating means further includes means for comparing the event sum to at least one threshold and means for incrementing the event sum if the event sum varies from at least one threshold.

Other aspects and advantages will become apparent upon consideration of the following detailed description and the attached drawings wherein like numerals designate like structures throughout the specification.

DETAILED DESCRIPTION

Figure 1:
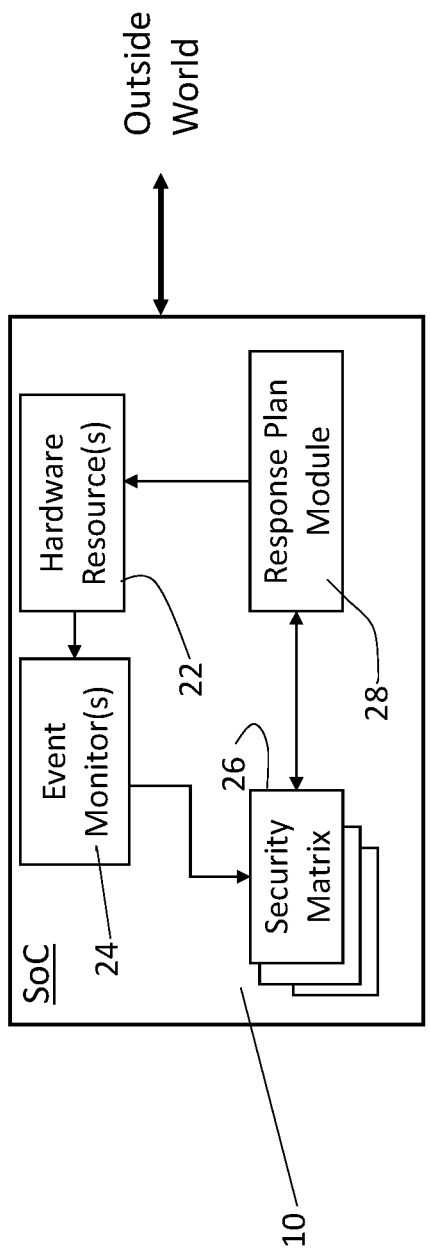
FIG. 1 is a first example of a digital system in the form of an SoC implementing a method of operating the SoC.
Figure 2:
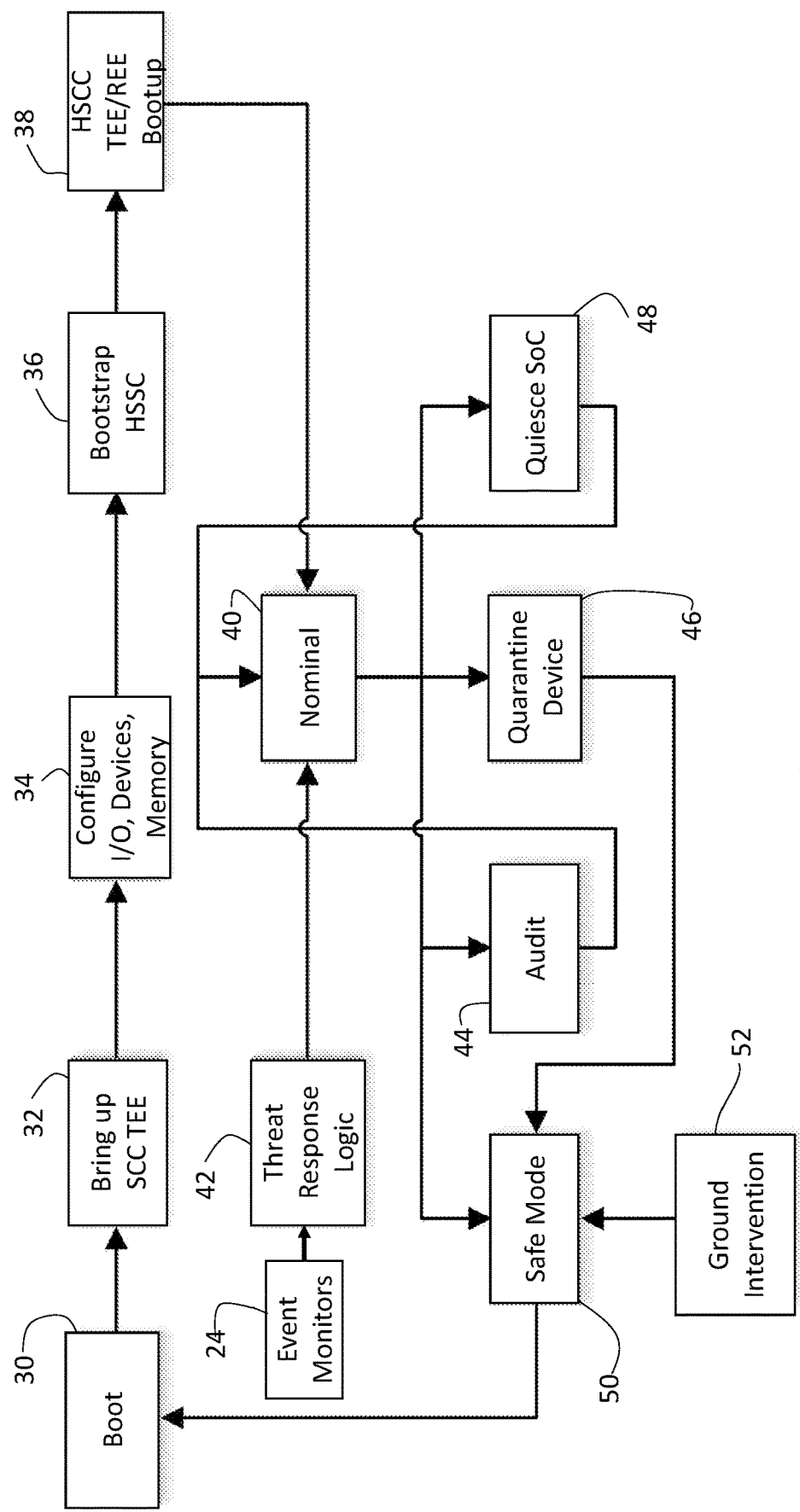
FIG. 2 is a block diagram illustrating the state flow of the SoC of FIG. 1.

FIGS. 1 and 2 illustrate two exemplary digital systems 10, 20, each of which may incorporate apparatus, programming, or a mix of apparatus and programming, to implement methods for operating the digital system, and/or one or more subsystems and components thereof, to identify and take action against malicious or other threats to operation of all or a part of the digital system. Each digital system 10, 20 utilizes event counters, a security matrix, and a response plan module to implement the operation methods. Specifically, according to one embodiment, when the system 10, 20 or a portion of such system comprising one or more subsystems are operating in a particular state, the event counter (s) count events of devices or portions thereof, such as system/subsystem component(s) implementing digital (for example, hardware) resource(s), and the resulting count(s) comprise one or more digital signatures of the function of the respective device or device portion while the overall system or subsystem remains in that state. The digital signature(s) are compared by the security matrix to associated digital signature(s) of a nominal operation profile for the current system/subsystem state that reflects the expected nominal activity for the respective device or device portion to obtain a risk score value (referred to as a parameter "risk_score"). A risk score that indicates unexpected operation of an associated device or device portion results in invocation of one or more actions by the response plan module to minimize security and/or operational threat(s).

When or if the system/subsystem changes state to reflect a change in function, then a different nominal operational profile comprising one or more different nominal digital signatures can be loaded and compared to accumulated events to obtain one or more further risk scores that indicate whether functionality of the device/device portion is falling within operational norms for that state.

In an exemplary embodiment the risk score is preferably determined on a per device or device subset, (e.g., per hardware resource in circumstances when a device implements multiple hardware resources), and optionally, per function basis. Thus, for example, one may wish to monitor a particular function, which can be implemented a set or subset of devices, part of a device, or any combination thereof. In an embodiment, the risk score reflects an accumulated value of activity for a specific device or device portion over a selected period of time, and the deviation of that accumulated activity value from expected high and/or low value thresholds. Each threshold may be determined in advance and/or may be determined/updated dynamically during operation. Thus, for example, as described below, one may use further/subsequent system states to define different threshold boundaries. For each hardware resource, for example, the designer chooses which events are relevant for monitoring and counting, what a relevant counting frequency would be, and the timing and duration of the counting periods and sampling intervals. For example, for an event that occurs in almost every clock cycle in every subsystem state, it may not be very relevant to accumulate such events with high precision. Specifically, all such events may be counted, but the precision of the counter value that may trigger a threshold crossing and potential response plan may be tracked with less precision. Thus, for example, the precision with which such events are tracked in order to trigger a response plan may be every 1000 or 10000 events. So while the event counter at the hardware resource is counting every single event that occurs potentially on almost every clock, it can pulse a signal to the security matrix associated with it that may reflect an event has occurred 1000 or 10000 (or a greater or lesser number of) times. Accordingly, the granularity with which the activity is monitored at the security matrix is not as great as at the event monitor, but the system may still count all events that occur on potentially every clock cycle thus allowing high precision monitoring of activity without having a large hardware counter resource requirement. In the examples above, every time the event counter of a monitored resource reaches 1000 or 10000 events, the counter resets, and the security matrix counter increments by one.

Further, it is possible to have two separate system states that can be closely related, and have, e.g., 95% of the same thresholds for nominal activity, while the remaining 5% may be used to accommodate the different threshold values that separate the 2 states. The requirement for dynamic threshold update should be based upon the response time needed to detect an off-nominal condition and react. In cases where a hardware resource has a very large dynamic range for nominal activity, and response times to perceived threats are critical, dynamically changing the activity threshold may be more desirable than changing the entire system state. The monitoring system could be set up such that the monitored resource has its own security matrix, multiple subsystem states for the resource, and its own dedicated hardware/software to enact a response plan. That response plan could feed into another system that monitors the overall SoC, so cascading a monitor/response-plan pair into another monitor/response plan system in a hierarchical manner may be considered if a subsystem is of particularly high value.

In a specific embodiment, risk_score is determined for a particular device or device portion (e.g., a component implementing a hardware resource) by detecting one or more event increments, wherein each event increment may comprise a single detected event or multiple detected events, optionally applying a weighted coefficient to each event increment, and then, in the circumstance that multiple weighted event increments are detected, summing all weighted events that arise during a particular interval to obtain an event sum value. The event sum value, denoted "event_sum," is then compared to at least one threshold, for example, high and low thresholds particular to the system, subsystem, device, component, or portion thereof and a current operational state associated with the system, subsystem, device, component, or portion thereof. If event_sum varies from the at least one threshold, then event_sum is incremented by a particular amount. In one specific embodiment, if event_sum is above or below respective high or low thresholds (i.e., if event_sum is outside a threshold range defined by high and low thresholds), then event_sum is incremented by an amount in dependence upon the absolute magnitude of how much the value of event_sum is outside the threshold range and the current system/subsystem state. In an alternative embodiment, the value of event_sum is compared to multiple high and/or low thresholds (i.e., multiple threshold ranges) and event_sum is increased by different amounts depending upon which threshold range(s) event_sum falls outside of in order to obtain a value of risk_score indicating the perceived risk of the monitored activity relative to what is expected for the device or device portion and the current system/subsystem state. The risk score can be used to invoke one or more actions, which may be isolationist, limiting, and/or corrective in nature.

In addition, in an embodiment, the value event_sum may be decremented at a certain rate as a function of time during the time period to obtain risk_score so that any risk score that is high can average out over a period of time. In a specific embodiment the rate of decrement may be a function of time interval, called the decrement_interval, that is or has been deemed relevant for the monitored device or device portion as a function of a reliable clock source. Once the allotted decrement_interval has ended or passed, risk_score is decremented by a value based on a value decrement_coefficient, which is a weighting factor to determine how much to subtract from event_sum to obtain the value risk_score. In an embodiment, the value risk_score is prevented from dropping below zero.

Thus, for example, an operational profile of a subsystem may be made up of risk scores across all the monitored hardware resources of the subsystem. These risk scores are tabulated in a dedicated hardware resource table and compared to expected (i.e., nominal) values for the system/subsystem represented by the nominal operational profile for that state. An out-of-expected operational profile results in action at the subsystem or other level (such as the overall system) to minimize possible deleterious effects of a perceived cybersecurity threat.

Referring to FIG. 1, an embodiment of a System on a Chip (SoC) device 10 that may be used as a spacecraft or other vehicle controller comprises one or more devices or device portions that implement one or more hardware resources 22 and one or more event monitors 24. There may be a like number of event monitors 24 as hardware resources 22 such that each event monitor 24 is associated with and monitors occurrences of one or more events of each hardware resource 22. Alternatively, the device 20 may include a different number of event monitors 24 as hardware resources 22. In any event, output(s) of the event monitors 24 are coupled to one or more instances of a security matrix module 26 each of which develops risk_score for each of the one or more hardware resources. If one or more of the values of risk_score indicates an out-of-nominal operating condition, a response plan module 28 manages operation of one or more of the hardware resource(s), system, and/or subsystem. In a preferred embodiment, and as described in greater detail hereinafter, the response plan module 28 invokes one or more operational actions of the associated and/or other of the hardware resource(s), system, subsystem(s), device(s), or portions thereof in dependence upon an identification of those hardware resource(s) that are operating outside threshold(s) during a selected period of time and the variation magnitude(s) of summed weighted event count(s) from the threshold(s).

Referring next to FIG. 2, the SoC 10 is operational in a number of states illustrated by blocks 30-40 and 44-50. Blocks 30, 32, 34, 36, and 38 illustrate boot states that are operational during a boot sequence (initialisms SCC TEE, I/O, HSCC, and REE stand for Security Core Complex Trusted Execution Environment, Input/Output, High Speed Core Complex, and Requirements Engineering Environment, respectively, as is evident to one of ordinary skill in the art). The SCC is a dedicated security partition firewalled off from the rest of the SoC, and contains a dedicated processing element and associated memory as well as its own software based execution environment, i.e., the TEE. The SCC is where the high security functions within an SoC take place, such as configuring the security policies for the rest of the higher speed hardware and shared resources before locking the hardware and shared resources down and then bringing the hardware and shared resources online. The HSCC is the high speed core complex that includes higher speed processing elements, memories, etc. . . . . It follows the security policies that are set up by the SCC, such as accessible hardware resources, memory map, I/O's that are accessible, etc. . . . . This complex undertakes all the performance-oriented processing in compliance with the security policy that is configured and monitored by the SCC. The block 40 implements the nominal operating state of the SoC. A block 42 implements the one or more instances of the security matrix 26 and the response plan module 28 of FIG. 1 and comprises threat response logic in the form of hardware, software, firmware, or a combination thereof that is responsive to the event monitor(s) 24 and develops an indication of a perceived threat to the SoC 10, such as an unauthorized intrusion, and invokes operation in states represented by the blocks 44-50 depending upon the perceived threat. The states implemented by such blocks and a general description of same are:

Audit (block 44)—perform an unscheduled automatic audit and self-test routine of the system, and/or subsystem, and/or device, and/or hardware resource, and/or one or more portions thereof;

Quarantine device (block 46)—the device and/or hardware resource having an out-of-threshold number of events during the selected period of time is quarantined from the remainder of the SoC 10;

Quiesce Soc (block 48)—the SoC 10 is placed in a minimally operative state; and

Safe mode (block 50)—the SoC 10 is placed in a safe mode of operation

In the illustrated embodiment recovery from the safe mode requires outside intervention (block 52), for example, by a reset signal transmitted by a ground station in the case in which the SoC 10 is used in a satellite.

Figure 3A:
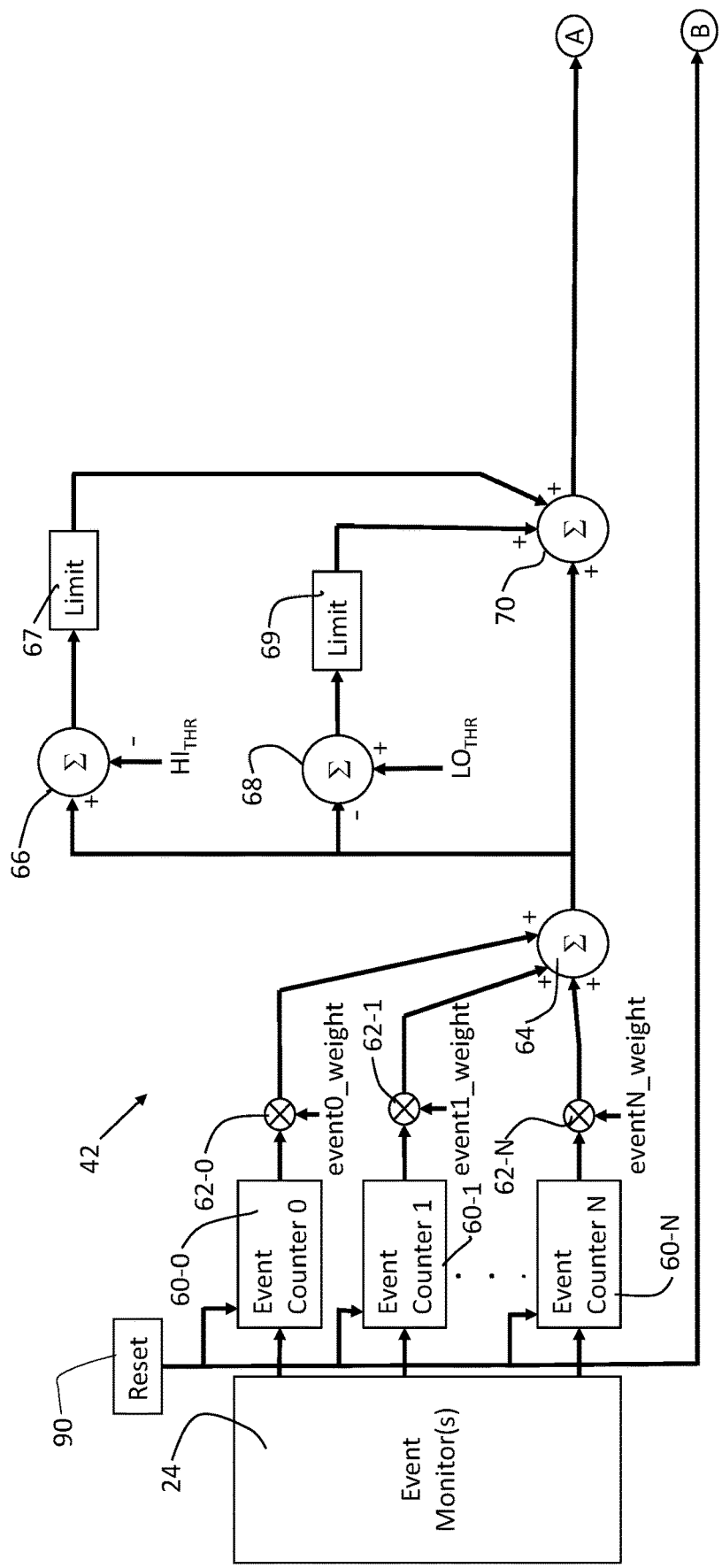
FIGS. 3A and 3B, when joined along the similarly lettered lines with FIG. 3A on the left and FIG. 3B on the right, together comprise a block diagram of the security matrix and response plan module of FIG. 1.
Figure 3B:
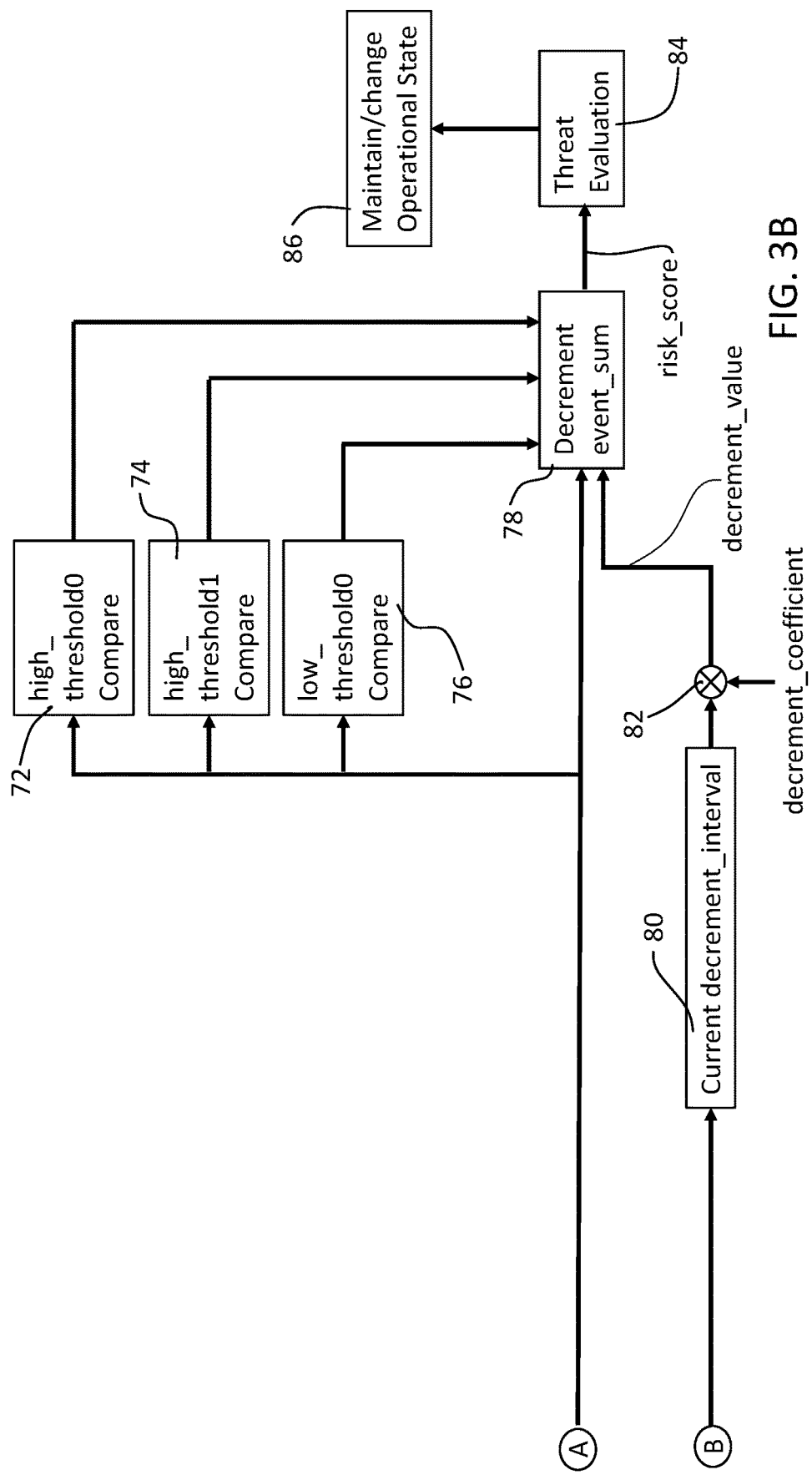

FIGS. 3A and 3B illustrate an example of the threat response logic 42 under the assumption that there are N event monitors that monitor N hardware resource events and that threats are evaluated by a single instance of a security matrix 26 at ends of a number of successive intervals, and further that the threat response logic 42 includes one or more event counters 60-0, 60-1, . . . , 60-N that accumulate counts of the N events detected by the event monitors 24. It should be noted that embodiments are not limited to this example. For example, a single hardware resource or other element may be monitored by one or a plurality of event monitors, and, in any case, there need not be a one-to-one relationship between event monitors and monitored devices or portions thereof. For example, a single event monitor may be time-multiplexed to detect events from multiple hardware resources or other elements. Further, in the case that a single hardware resource is monitored by multiple event monitors, it would typically be the case that different functional aspects of the single hardware resource are monitored by associated event monitors. Also, the outputs of multiple event monitors may be counted and the counts processed to obtain a risk score for: 1.) a single functional aspect of a single hardware resource; 2.) a portion or the entirety of the hardware resource; or 3.) all or a part of the system, one or more subsystems or one or more portions thereof, or one or more devices or components or one or more portions thereof. Typically, events arising in the system, one or more subsystem(s), or portions thereof, or one or more devices or components/functions thereof may be monitored, counted, and processed to obtain the risk score for a system or subsystem or a portion thereof, although this need not be the case. For example, one could monitor any particular set of functions or function with any one or more sets of event monitors, providing the hardware has the accessibility and configurability to support those various modes within the digital system. In cases where different events are accessible and configurable to be monitored by a fixed set of event monitors, different events in different operational states may be considered to be more pertinent to monitor than others. Therefore, some type of reconfigurability of the event monitors as system states are changing is a possible embodiment of the event monitoring logic.

As seen in FIG. 3A, at the end of each interval, a plurality of multipliers 62-0, 62-1, . . . , 62-N multiply current values of counted events designated event0_count, event1_count, , eventN_count by weighting values designated event0_weight, event1_weight, . . . , event N_weight, respectively, and a summer 64 adds the multiplied values to obtain a preliminary value of event_sum as follows:

$$event\_sum = event0\_count * event0\_weight + event1\_count * event1\_weight + \ldots + eventN\_count * eventN\_weight. \quad 1)$$

The weighting values reflect varying perceived magnitudes of risk identified by the accumulated events of the associated monitored elements, such as hardware resources.

The preliminary value of event_sum is compared to high and low threshold values $HI_{THR}$ and $LO_{THR}$ by summers 66, 68, respectively, to obtain first and second deviation values that represent the magnitudes of deviation of event_sum from $HI_{THR}$ and $LO_{THR}$. Limiters 67 and 69 limit the magnitudes of the first and second deviation values so that such values do not drop below zero. The limited deviation values together represent whether event_sum is outside of threshold limits represented by $HI_{THR}$ and $LO_{THR}$ and, if so, the magnitude (i.e., the absolute magnitude) of deviation of event_sum from the threshold limits. The limited deviation values are provided to a summer 70 that adds such values to the preliminary value of event_sum to obtain an updated value of event_sum.

As shown in FIG. 3B, the updated value of event_sum is compared against two upper threshold values high_threshold0 and high_threshold1 and a lower threshold value low_threshold0 by blocks 72, 74, 76, respectively, and results of the comparisons may be optionally used by a block 78 to reduce the updated value of event_sum by a value denoted decrement_value obtained from blocks 80, 82 dependent upon an indication of the current interval in the current time period (noted below in connection with FIG. 6) to obtain the value risk_score as follows:

$$decrement\_value = current\ value\ of\ decrement\_interval * decrement\_coefficient; \quad 2)$$

if((event_sum>high_threshold1) and (previous_risk_score+2−decrement_value>0)) then
risk_score=previous_risk_score+2−decrement_value;

if((event_sum>high_threshold0) and (previous_risk_score+1−decrement_value>0)) then
risk_score=previous_risk_score+1−decrement_value;

else if((event_sum<low_threshold0) and (previous_risk_score+1 decrement_value>0)) then
risk_score=previous_risk_score+1−decrement_value. $\quad$ 3)

where previous_risk_score is the value of risk_score as determined in the immediately preceding interval of the current time period. It should be noted that the decrementing of event_sum to obtain risk_score is optional and may not be undertaken if a determination is made that the undecremented value of event_score is believed to be a better indicator of whether a cybersecurity event is occurring or has occurred. In this case, the updated value of event_sum is used as the value risk_score.

The magnitude of risk_score thus determined is evaluated and categorized by a block 84 as falling within one of five ranges of values denoted: "No Risk," "Low Risk," "Medium Risk," High Risk," and "Extreme Risk." A block 86 causes operation of the SoC in dependence upon the categorization undertaken by the block 84. Specifically, a threat evaluation of No Risk causes the SoC to operate in the Nominal state, block 40 of FIG. 2. A threat evaluation of Low Risk, Medium Risk, High Risk, or Extreme Risk causes the SoC to operate in the states represented by the blocks 44, 46, 48, or 50, respectively, of FIG. 2. The blocks 84 and 86 implement the response plan module 28 of FIG. 1 while the balance of the elements of FIGS. 3A and 3B implement the security matrix 26.

Figure 6:
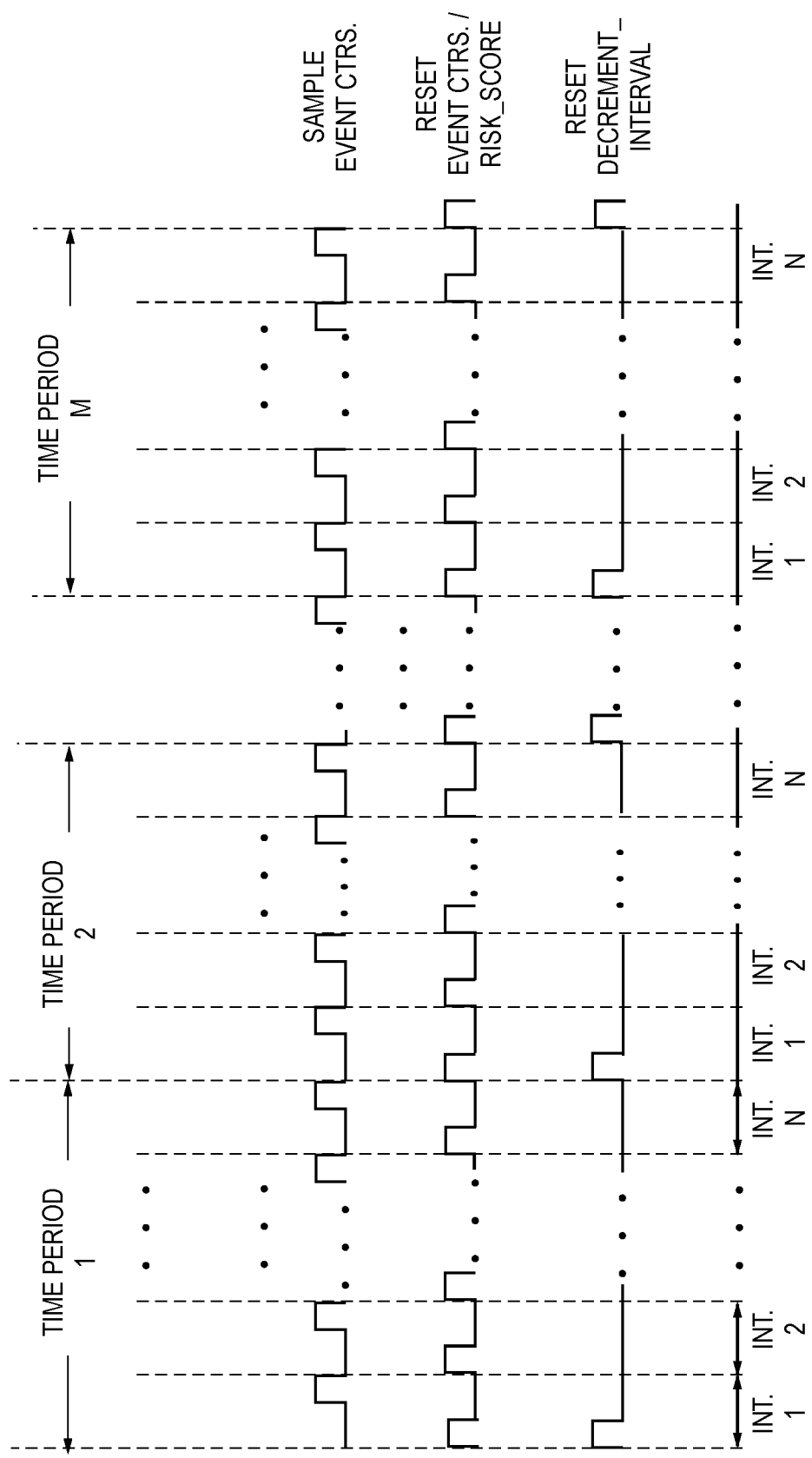
FIG. 6 comprises a timing diagram illustration exemplary operation of the security matrix and response plan module of FIG. 1

Referring again to FIG. 3A and FIG. 6, a reset module 90 is operable at an end of each interval to reset the values accumulated by the event counters 60 to initial values (e.g., zero), and further resets the decrement_interval value of FIG. 3B at the end of each time period to an initial value (also e.g., zero). It may be noted that the latter reset need not be synchronous with respect to the operation of the various modules. Also, depending upon the decrementing and incrementing values that are used, the value of risk_score may be periodically or aperiodically reset (e.g., after a fixed number of intervals or time periods or upon a system change of state) or may never be reset and allowed to be persistent over some or all of the time periods. Thus, as seen in FIG. 6, in an embodiment, the event counters 24 are always counting during each sampling interval, then the accumulated values are sensed at the end of the interval. The security matrix 26 updates and thus determines any risk score impact immediately following the end of the interval. The event monitors 24 are reset following each interval to start a new sampling interval. The security matrix 26, however, retains the counts over multiple sampling intervals as the security matrix 26 preferably keeps a persistent state so as to properly characterize the events over a longer stretch of time. The frequency with which event monitors update the count within the security matrix, and what the count represents can be a function of the frequency of the event that is monitored. Higher frequency events can assign a lower fidelity per bit within the event counter such that a single count value may represent hundreds or thousands of positive triggered events.

In general, a nominal operation profile for a system/subsystem may be made up of nominal risk scores across all the monitored hardware resources using the above methodology under the assumption that the system/subsystem is operating in a particular state and no threats are attempting to affect operation of the system/subsystem. These nominal risk scores may be tabulated and stored in a dedicated hardware resource table in the security matrix 26 for each system/subsystem state and, in the illustrated embodiment, may be used to establish one or more initial, variable, and/or constant values for at least one of the thresholds $HI_{THR}$ and $LO_{THR}$, and, optionally one or more of high_threshold0, high_threshold1, and low_threshold0. Later value(s) of risk_ score may or may not be stored in the resource table and/or may be compared to associated nominal values thereof for the operational state. In embodiments, the results of the comparisons may be used to determine action to be taken and/or modification of the nominal values to take new operating conditions into account.

The response plans must be executed on a supervisory or other processor that has the authority and ability to access all the control mechanisms within the subsystem to bring hardware resources back into compliance, including quarantine. These control mechanisms could be in the form of credit settings, device resets, force quiesce, processor resets, and anything else that might be relevant to halt a hardware device in either a graceful or forceful manner.

The foregoing methodology can implement an arbitrary number of levels of risk_score increases leading to different operation of the relevant system/subsystem or other element(s) and/or portions thereof and can use an arbitrary number of high/low thresholds. For example, when a risk score reaches a certain predefined threshold level, the security matrix 26 may generate a message that is sent as an interrupt to a supervisory processor agent instructing the appropriate action to undertake commensurate with the level of perceived risk. This could take the form of an interrupt line from the security matrix 26 with specific interrupt vectors that reflect the different response plans that can bring back the misbehaving hardware resource into compliance, or quarantine it. If the risk is considered to be relatively low, a response plan could enact increased logging in the form of enabling other monitors or software based monitors for that hardware resource. If the threat level perceived is high, then a response plan could forcibly disable that device, quarantine it, and then let the subsystem carry on until ground intervention. If the threat level is critical, the response plan could halt all processor cores except the supervisory one, forcibly halt all internal I/O and memory traffic, and go to a safe state, described below. Thus, the higher the risk score, the more aggressive the action could be.

If desired, an additional, default response plan could be implemented for scenarios that are not explicitly covered by the remaining response plans. The default plan could be in the form of a system safe state where all application processor cores are halted and parked, all unnecessary internal and external traffic is halted, and the subsystem is just performing tasks that are mission critical to the function of the spacecraft or other installation while waiting for ground or other command intervention.

Figure 4:
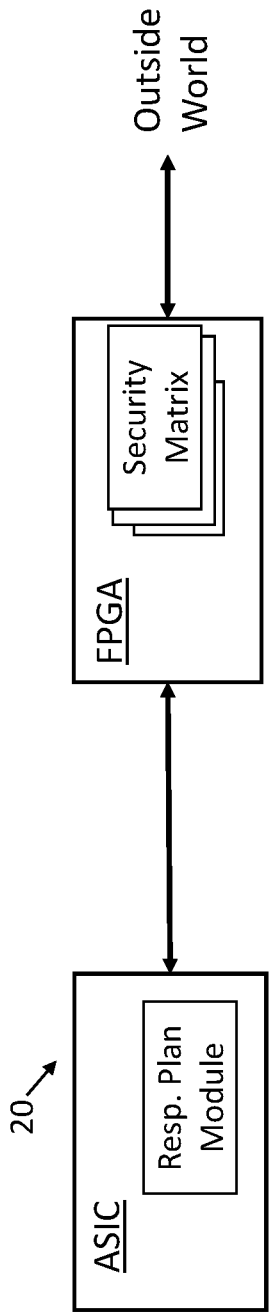
FIG. 4 is a second example of a digital system in the form of an ASIC and FPGA that together include implement a method of operating the ASIC and FPGA.

FIG. 4 shows the digital system 20 comprising a combination of an ASIC 100 and FPGA 102 that together implement a control system useful, for example, as a spacecraft or other vehicle controller. The ASIC 100 may be replaced by two or more ASIC's or one or more FPGA's or combinations thereof. Also, the FPGA may be replaced two or more FPGA's or by one or more additional ASIC's, as desired. The various elements of the ASIC(s) and/or FPGA(s) may be implemented by software, hardware, firmware, or a combination thereof.

The response plan module 28 is implemented by the ASIC 100 and the security matrix 26 is implemented by the FPGA 102. If desired, the module 28 and the security matrix 26 may alternatively be implemented by the FPGA 102 and the ASIC 100, respectively, or the both elements 26, 28 may be implemented by one of the FPGA 102 or the ASIC 100, or portions of one or both of the elements 26, 28 may be implemented by one or both of the FPGA 102 and/or ASIC 100.

Figure 5:
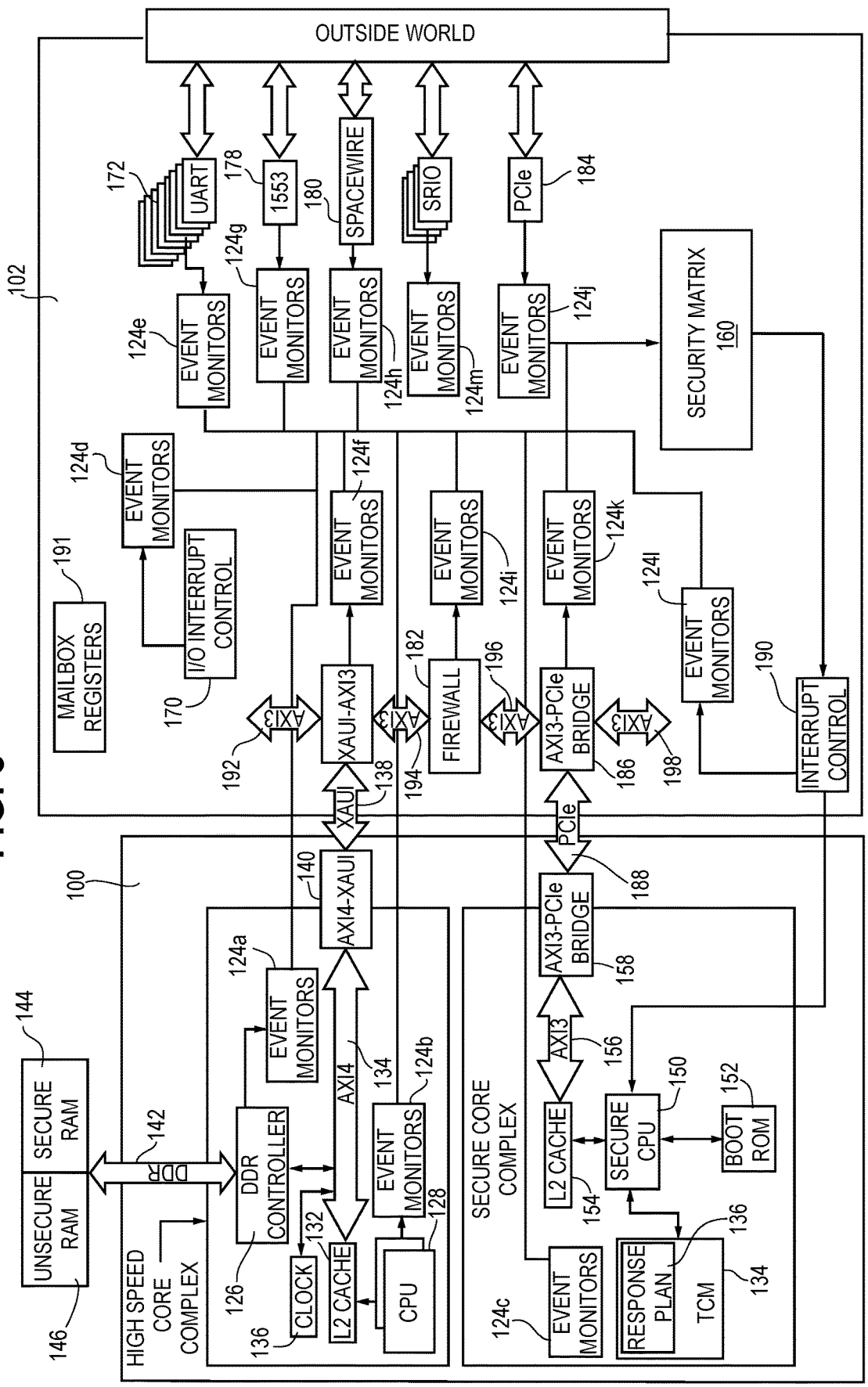
FIG. 5 comprises a block diagram of the system of FIG. 4 illustrating the system in greater detail.

FIG. 5 illustrates the system 20 in greater detail. Event monitors 124a and 124b monitor events arising during operation of a DDR controller 126 and one or more high performance CPU's 128 both comprising portions of a high speed core complex 130 of the ASIC 100. The CPU's 128 communicate via a level 2 cache 132 with an AXI4 communications bus 134. The bus 134 further communicates with the DDR controller 126, a clock 136, and an XAUI communications bus 138 via an AXI4-XAUI bridge 140. The DDR controller 126 further communicates over a DDR communications bus 142 with secure and unsecure RAM modules 144, 146.

A secure core complex 132 of the ASIC 100 includes a TCM 134 that, among other things, implements functionality represented by a block 136 similar or identical to the response plan module 28 of FIG. 1. One or more event monitors 124c monitor events arising during operation of the TCM 134. The TCM 134 further communicates with a secure CPU 150 coupled to an associated boot ROM module 152. The secure CPU 150 communicates via a level 2 cache module 154 and an AXI3 communications bus 156 with an AXI3-PCIe bridge 158.

The FPGA 102, which may comprise a radiation-tolerant FPGA referred to as an RTG4™ module made and/or sold by Microsemi Corporation of Aliso Viejo, Calif., includes one or more event monitors 124d-124m that monitor various events of various devices and at least some of the event monitors are coupled to one or more instances of a security matrix 160. Each instance of the security matrix 160 may implement functionality similar or identical to the security matrix 26 of FIG. 1, although different instances thereof may implement different functionality, such as comparison with other threshold comparisons, other increment/decrement values and combinations thereof, and further that each instance of the security matrix 160 may invoke the same or different other threat response actions through an interrupt control module 190 described below, etc.

Specifically, event monitors 124d-124l are coupled to and receive event occurrences from an I/O interrupt control module 170, a plurality of UART modules 172, an XAUI-AXI3 bridge 174 that communicates with the XAUI bus 138, a MIL-STD-1553 LAN controller 178, a SpaceWire communication network 180, a firewall 182, a PCIe communications bus 184, an AXI3-PCIe bridge 186 that communicates with the AXI3-PCIe bridge 158 of the ASIC 100 over a PCIe communications bus 188, and the interrupt control module 190, respectively. A mailbox register module 191, the bridge 174, the firewall 182, the bridge 186, and the interrupt control module 190 communicate with one another over AXI3 communications buses 192, 194, 196, and 198. If desired, any communication protocol, may be replaced by a different protocol and associated bus and bridge, as desired. Thus, for example, an AXI4 bus may be replaced by an AXI3 bus (with associated bridge(s) as required), a PCIe bus and associated bridge(s) may be replaced by a Serdes bus and associated bridge(s), etc. Thus, one or more of the communications protocols may be changed, but do not affect the character of the various embodiments.

The UART modules 172, 1553 LAN controller 178, SpaceWire communications network, a plurality of SRIO modules 200, and the PCIe communications bus 184 communicate with remote devices/systems (collectively referred to as the "outside world") in any suitable fashion. The SRIO modules 200 may be associated with one or more of the event monitors 124*m*, the output(s) of which may or may not be provided to one or more instances of the security matrix 160.

The monitored event occurrences from the event monitors 124*d*-124*l* together with the monitored event occurrences from the event monitors 124*a*-124*c* located in the ASIC 100 are provided to one or more instances of the security matrix 160. Selected ones or all of the monitored event occurrences are supplied to each instance of the security matrix 160. For each instance of the security matrix 160, and as described above, counts of the selected monitored event occurrences arising during an interval are weighted, the weighted values are added and compared to thresholds to obtain for that interval a value of event_sum, which is optionally decremented depending upon whether an absolute magnitude of event_sum or a decremented value is a better indication of a cybersecurity threat, and using the developed value of risk_score to determine whether action, such as those described above, should be taken.

INDUSTRIAL APPLICABILITY

In summary, the present approach provides a way to customize threat detection monitoring in heterogenous digital subsystems to address the rising capability of external threats to national security. Alternatively or in addition, the operational health of a system/subsystem can be ascertained and appropriate action taken to minimize possible or actual deleterious effects resulting therefrom. Overall, this system allows hardware defined monitoring to detect any off-nominal behavior, triage the deviation, and enact a plan that brings the system back into compliance. If compliance cannot be obtained then reducing the risk becomes the driving factor. Different operational states of the subsystem can warrant different security profiles that are relevant to the mode of the subsystem. This gives the threat monitoring system flexibility and sensitivity with respect to operational contexts, and ensures the system engineers understand what the system is doing under all circumstances.

All references herein to "system" or "systems" include not only SoC's, ASIC's, and FPGA's, but also any other device that comprises one or more systems or subsystems. Also, a reference to a "system" or "systems" herein is to be interpreted as a reference to a "subsystem" or "subsystems," respectively, and vice versa, and one or more portions thereof inasmuch as the features disclosed herein are equally applicable to an overall system or a subsystem or any one or more portions thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. A method of operating a digital system operable in multiple operational states having a digital resource and an event detector that detects events of the digital resource, the method comprising the steps of:
   (a.) determining an operational mode of at least one of the system and the digital resource in effect during an interval;
   (b.) accumulating a number of events that occur during the interval;
   (c.) comparing accumulated events against at least one threshold associated with the operational mode; and
   (d.) implementing at least one of isolationist, limiting, and corrective action if the comparison indicates an out-of-nominal operation of the digital resource;
   wherein the digital system has a plurality of further event detectors that detect a plurality of further events, and including the further steps of (e.) accumulating further events, (f.) weighting accumulated events, (g.) summing accumulated and weighted events to obtain an event sum, (h.) comparing the event sum to at least one threshold, and (i.) incrementing the event sum if the event sum varies from at least one threshold.

2. The method of claim 1, wherein the step (c.) includes the step of determining if the digital resource is operable outside nominal limits.

3. The method of claim 1, wherein the step (d.) includes the steps of defining a plurality of actions and selecting one of the plurality of actions dependent upon a number of accumulated events.

4. The method of claim 3, wherein the step (c.) includes the step the number of accumulated events against an upper limit and a lower limit.

5. The method of claim 1, further including the step of (j.) decrementing the incremented event sum as a function of time interval.

6. The method of claim 1, wherein the at least one of isolationist, limiting, and corrective action comprises quarantine of the digital resource, quiescence of the digital system, a safe mode of operation of the digital system, and auditing of at least a portion of the digital system.

7. A digital system operable in multiple operational states, comprising:
- a digital resource;
- an event detector that detects events of the digital resource;
- a security matrix having at least one event counter that accumulates a number of events of the digital resource that occur as the digital system is operating in a particular operational state during a time interval and that wherein the security matrix compares accumulated events against at least one threshold associated with the particular operational state to obtain a risk score value; and
- a threat evaluation module implementing at least one of isolationist, limiting, and corrective action if the risk score value indicates an out-of-nominal operation of the digital resource;
- wherein the digital system has a plurality of further event detectors that detect a plurality of further hardware events, and wherein the security matrix is further operable to accumulate further hardware events, weighting accumulated hardware events, and summing accumulated and weighted hardware events to obtain an event sum; and
- wherein the security matrix is further operable to compare the event sum to at least one threshold and incrementing the event sum if the event sum varies from at least one threshold.

8. The digital system of claim 7, wherein the security matrix is operable to determine if the digital resource is operable outside nominal limits.

9. The digital system of claim 8, wherein the security matrix is operable to compare the number of accumulated digital resource events against an upper limit and a lower limit.

10. The digital system of claim 7, wherein the security matrix is further operable to decrement the incremented event sum as a function of time interval.

11. The digital system of claim 7, wherein the at least one of isolationist, limiting, and corrective action comprises quarantine of the digital resource, quiescence of the digital system, a safe mode of operation of the digital system, and auditing of at least a portion of the digital system.

12. A digital system operable in multiple operational states, comprising:
- a digital resource;
- means for detecting events of the digital resource;
- means having at least one event counter for accumulating a number of events of the digital resource that occur as the digital system is operating in a particular operational state during a time interval and including means for comparing accumulated events against at least one threshold associated with the particular operational state to obtain a risk score value; and
- means for implementing at least one of isolationist, limiting, and corrective action if the risk score value indicates an out-of-nominal operation of the digital resource;
- wherein the detecting means detect a plurality of further hardware events, and wherein the accumulating means accumulates further hardware events and includes means for weighting accumulated hardware events and means for summing accumulated and weighted hardware events to obtain an event sum; and
- wherein the accumulating means further includes means for comparing the event sum to at least one threshold and means for incrementing the event sum if the event sum varies from at least one threshold.

13. The digital system of claim 12, wherein the accumulating means includes means for comparing the number of accumulated digital resource events against an upper limit and a lower limit.

14. The digital system of claim 12, wherein the accumulating means further includes means for decrementing the incremented event sum as a function of time interval to obtain a risk score and wherein the implementing means includes means responsive to the risk score for invoking quarantine of the digital resource, quiescence of the digital system, a safe mode of operation of the digital system, and auditing of at least a portion of the digital system.

* * * * *

UNITED STATES PATENT AND TRADEMARK OFFICE
CERTIFICATE OF CORRECTION

PATENT NO. : 11,321,157 B2  
APPLICATION NO. : 17/008177  
DATED : May 3, 2022  
INVENTOR(S) : Eric L. Hendrickson Page 1 of 1

It is certified that error appears in the above-identified patent and that said Letters Patent is hereby corrected as shown below:

In the Claims

Column 12, Claim 4, Line 58, after "step" please insert --of comparing--.

Column 13, Claim 7, Lines 9-10, please delete "and that".

Signed and Sealed this
Thirtieth Day of August, 2022

Katherine Kelly Vidal
*Director of the United States Patent and Trademark Office*